US006908574B2

(12) United States Patent
Inamura et al.

(10) Patent No.: US 6,908,574 B2
(45) Date of Patent: Jun. 21, 2005

(54) TIN-CONTAINING INDIUM OXIDES, A PROCESS FOR PRODUCING THEM, A COATING SOLUTION USING THEM AND ELECTRICALLY CONDUCTIVE COATINGS FORMED OF THEM

(75) Inventors: Tatsumi Inamura, Honjo (JP); Yoshio Moteki, Honjo (JP); Yoshichika Horikawa, Honjo (JP); Kohichiro Eshima, Honjo (JP)

(73) Assignee: Dowa Mining Co., Ltd., Tokyo (JP)

( * ) Notice: Subject to any disclaimer, the term of this patent is extended or adjusted under 35 U.S.C. 154(b) by 340 days.

(21) Appl. No.: 10/108,618

(22) Filed: Mar. 28, 2002

(65) Prior Publication Data
US 2003/0030036 A1 Feb. 13, 2003

(30) Foreign Application Priority Data

Aug. 13, 2001 (JP) ........................................ 2001-245701
Sep. 28, 2001 (JP) ........................................ 2001-299862

(51) Int. Cl.[7] ........................ H01B 1/08; C01G 19/02; C01G 15/00
(52) U.S. Cl. ...................... 252/518; 252/500; 252/520; 423/618; 423/624
(58) Field of Search ................................. 252/500, 518, 252/520, 503, 518.1, 520.1; 423/89, 111, 618, 624; 428/357, 364, 212, 323; 502/355

(56) References Cited

U.S. PATENT DOCUMENTS

| | | | | | |
|---|---|---|---|---|---|
| 4,345,000 | A | * | 8/1982 | Kawazoe et al. | ............ 428/212 |
| 5,580,496 | A | * | 12/1996 | Yukinobu et al. | ......... 252/520.1 |
| 5,939,243 | A | * | 8/1999 | Eichorst et al. | ............. 430/530 |
| 6,168,911 | B1 | * | 1/2001 | Lelental et al. | ............. 430/529 |
| 6,200,674 | B1 | * | 3/2001 | Kumar et al. | ............... 428/332 |

FOREIGN PATENT DOCUMENTS

| | | | | |
|---|---|---|---|---|
| JP | 6-80422 | A | 3/1994 | |
| JP | 06-080422 | * | 3/1994 | ........... C01G/15/00 |
| JP | 7-232920 | A | 9/1995 | |
| JP | 7-235214 | A | 9/1995 | |
| JP | 8-217446 | A | 8/1996 | |
| JP | 08-302246 | * | 11/1996 | ............ C09D/5/24 |

* cited by examiner

Primary Examiner—Mark Kopec
(74) Attorney, Agent, or Firm—Frishauf, Holtz, Goodman & Chick, P.C.

(57) ABSTRACT

A Sn-containing In oxide in the form of needles or plates comprising particles having a major axis of 0.1 μm or less and a minor axis of 0.05 μm or less.

18 Claims, 8 Drawing Sheets

TIN-CONTAINING INDIUM OXIDES, A PROCESS FOR PRODUCING THEM, A COATING SOLUTION USING THEM AND ELECTRICALLY CONDUCTIVE COATINGS FORMED OF THEM

BACKGROUND OF THE INVENTION

This invention relates to Sn-containing In oxides (hereunder sometimes referred to as ITO), a process for producing them, a coating solution containing them, and electrically conductive coatings formed of them.

Indium (In) oxides containing comparatively small amounts of Sn are commonly called ITO and are not only transparent to visible light but also high in electrical conductivity; hence, they are used to form transparent, electrically conductive films in various kinds of display device and solar cells.

Two major categories of known techniques for producing transparent conductive films from ITO are the physical approach such as sputtering and the coating process involving the application of liquid particle dispersions or organic compounds. The films formed by the coating process are somewhat low in electrical conductivity compared to the films formed by the physical approach such as sputtering; on the other hand, films of complex shape can be deposited on large-area substrates without using expensive equipment such as vacuum systems. Compared to the pyrolysis of organic compounds, the application of liquid particle dispersions permits film formation by a colder process and the resulting film having reasonable conductivity is extensively used as a shield of electromagnetic waves on CRTs. The application of the film as transparent electrodes on display devices such as LCDs and ELs is under current review. However, the coatings formed by the application of liquid particle dispersions do not have as high conductivity as the sputtered films and are still unsuitable for use on large-area CRTs or incapable of forming high-definition electrodes on display devices. It is therefore desired to develop ITO particles that can produce transparent coatings of improved conductivity which meet those use requirements.

In conductive coatings, current-carrying paths are formed by the contact between ITO particles. Since flakes, needles and tabular grains have increased chance for the creation of such current-carrying paths (ITO particles contact each other on an increased number of faces), they are used to provide increased conductivity (i.e., lowered resistivity). Known attempts to produce various particle shapes include:
(A) producing acicular ITO particles having a major axis of 5 $\mu$m or more and a major-to-minor axis ratio of at least 5 (JP 7-232920 A and JP 7-235214 A);
(B) applying the coating of conductive fine particles to titanium oxide ribbons measuring 1–100 $\mu$m long by 0.2–20 $\mu$m wide by 0.01–2 $\mu$m thick (JP 8-217446 A); and
(C) producing ITO needles having an aspect ratio of at least 4 with a major axis of 0.2–0.95 $\mu$m and a minor axis of 0.02–0.1 $\mu$m (JP 6-80422 A).

The ITO particles produced by method (A) are large and have lowered resistance values but, on the other hand, their optical characteristics such as transmittance are poor and, in particular, the scattering of light increases to produce more haze on the coatings. Method (B) uses $TiO_2$ ribbons and is believed to produce a sufficient number of points of contact; on the other hand, the particles produced by method (B) are so large that they suffer the same problem as the particles produced by method (A). In addition, since the less conductive $TiO_2$ particles are coated with the conductive material, the bulk resistance of the grains is high enough to prevent the development of satisfactory conductivity in the coatings. The particles produced by method (C) are smaller than those produced by method (A) and their optical characteristics are somewhat improved; on the other hand, the particles of method (C) are larger than one half the wavelength of visible light (400–700 nm) and when they are packed in the coatings, scattering of light occurs, making it impossible to assure sufficient transmittance of visible light and prevention of haze.

Haze is a characteristic property that describes the percent scattering of light and as a characteristic of transparent electrode films, smaller haze is desirable. The present inventors have shown that haze is strongly influenced by the shape of ITO particles and the degree of their dispersion.

SUMMARY OF THE INVENTION

The principal object of the invention is to provide Sn-containing In oxides in acicular or tabular form that are optimum for forming highly transparent and conductive coatings by applying liquid particle dispersions.

In the course of the studies conducted to attain this object, the present inventors thought that by using the particles of Sn-containing In oxides in acicular or tabular form with their size and major-to-minor axis ratio specified to lie within certain ranges, the faces at which the Sn-containing In oxide particles as a conductive material would contact each other in coatings would be sufficiently increased to provide better conductivity while suppressing the scattering of light. The inventors conducted an intensive study on the basis of this finding and could successfully create aggregation-free, fine Sn-containing In oxides by neutralizing a Sn/In-containing, acidic aqueous solution in two or more stages through the addition of an alkali. The coatings formed of those Sn-containing In oxides had higher conductivity than before and they still were capable of suppressing the scattering of light.

Another object of the invention is to provide an optimum ITO powder that has good enough dispersability to permit effective application of a slurry of dispersed particles and which is capable of forming coatings that have outstanding optical characteristics, namely, high transmission of light and low haze, and which show high conductivity.

Yet another object of the invention is to provide a transparent conductive film that is formed of such ITO powder.

In order to attain the second and third objects of the invention, the present inventors noted the shape of fine ITO particles and found the possibility of achieving high conductivity and high transmittance of light by combining two or more shapes of ITO particles. Based on this finding, the inventors continued their study and eventually accomplished the present invention.

Figure 4:
Figure 5:
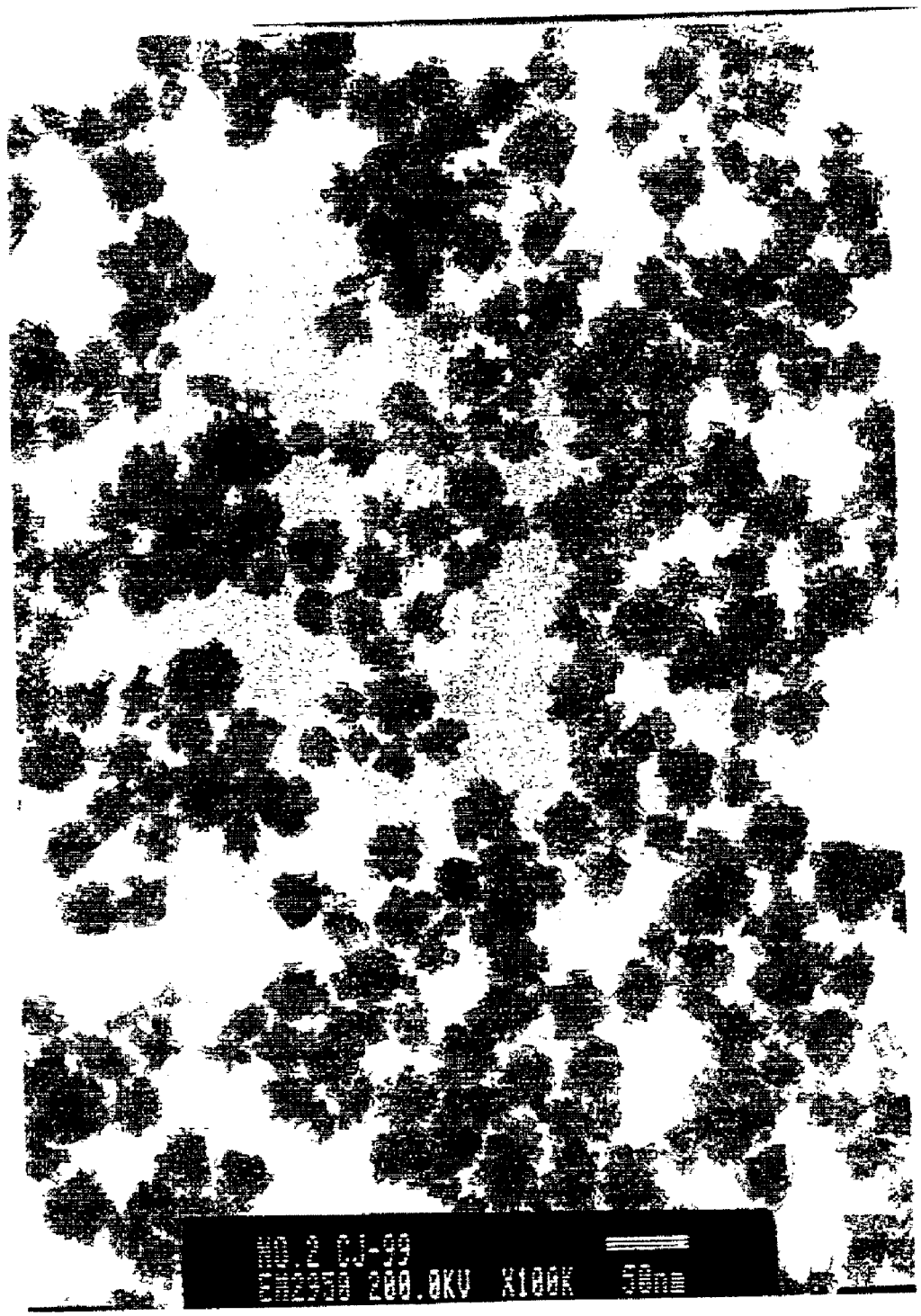
Figure 6:
Figure 7:
Figure 8:

(the micrograph taken at 200.0 kV×30 K; the clear straight line at the bottom indicates a length of 200 nm);

FIG. 4 is a transmission electron micrograph of the Sn-containing In oxide particles prepared in Example 2 (the micrograph taken at 200.0 kV×100 K; the clear straight line at the bottom indicates a length of 50 nm);

FIG. 5 is a transmission electron micrograph of the Sn-containing In hydroxide particles prepared in Comparative Example 1 (the micrograph taken at 200.0 kV×100 K; the clear straight line at the bottom indicates a length of 50 nm);

FIG. 6 is a transmission electron micrograph of the Sn-containing In oxide particles prepared in Comparative Example 1 (the micrograph taken at 200.0 kV×100 K; the clear straight line at the bottom indicates a length of 50 nm);

FIG. 7 is a transmission electron micrograph of the Sn-containing In hydroxide particles prepared in Comparative Example 2 (the micrograph taken at 200.0 kV×50 K; the clear straight line at the bottom indicates a length of 100 nm); and FIG. 8 is a transmission electron micrograph of the Sn-containing In oxide particles prepared in Comparative Example 2 (the micrograph taken at 200.0 kV×30 K; the clear straight line at the bottom indicates a length of 200 nm).

DETAILED DESCRIPTION OF THE INVENTION (1) Firstly, the present invention provides a Sn-containing In oxide in the form of needles or plates that have a major axis of 0.2 μm or less and a minor axis of 0.1 μm or less.

(2) Secondly, the invention provides the Sn-containing In oxide of (1) having a major axis of 0.1 μm or less and a minor axis of 0.05 μm or less.

(3) Thirdly, the invention provides the Sn-containing In oxide of (1) or (2) having a major-to-minor axis ratio of 1.5–10.

(4) Fourthly, the invention provides a coating solution having the particles of the Sn-containing In oxide of (1), (2) or (3) dispersed in a solvent or a resin-containing solvent.

(5) Fifthly, the invention provides an electrically conductive coating containing the particles of the Sn-containing In oxide of (1), (2) or (3) as a conductive material.

(6) Sixthly, the invention provides a process for producing the Sn-containing In oxide of (1), (2) or (3) which comprises the steps of preparing an acidic aqueous solution containing Sn and In, adding an alkali to the acidic aqueous solution to effect preliminary neutralization, raising the temperature of the preliminarily neutralized aqueous solution, adding the alkali to the aqueous solution to fully neutralize it, and firing the resulting Sn-containing In hydroxide.

(7) Seventhly, the invention provides the process of (6), wherein the acid in said acidic aqueous solution is HCl, $HNO_3$ or $H_2SO_4$ and said alkali is $NH_4OH$, NaOH or KOH.

(8) Eighthly, the invention provides the process of (6) or (7), wherein the preliminarily neutralized solution has a pH of 2–4 and the fully neutralized solution has a pH of 7–8.

(9) Ninthly, the invention provides the process of (6), (7) or (8), wherein said preliminary neutralization is performed at a solution's temperature of 45° C. or below and said full neutralization is performed at a solution's temperature of 50° C. or above.

(10) Tenthly, the invention provides the process of (6), (7), (8) or (9), wherein said firing is performed in an inert gas containing water vapor or both water vapor and a reducing gas at 300–1,000° C. while maintaining the shape anisotropy of the particles of said Sn-containing In hydroxide.

(11) Eleventhly, the present invention further provides a transparent conductive film forming ITO powder comprising at least acicular ITO particles and granular ITO particles.

(12) Twelfthly, the invention provides the transparent conductive film forming ITO powder of (11), wherein the weight ratio of said acicular ITO particles to said granular ITO particles is in the range of from 2:98 to 98:2.

(13) Thirteenthly, the invention provides the transparent conductive film forming ITO powder of (11) or (12), wherein said acicular ITO particles have a major axis of 0.5 μm or less, a minor axis of 0.1 μm or less, a major-to-minor axis ratio of 1.5–10 and a $SnO_2$ content of 2–20 wt % whereas said granular ITO particles have a grain size of 0.05 μm or less and a $SnO_2$ content of 2–20 wt %.

(14) Fourteenthly, the invention provides a transparent conductive film comprising an ITO powder comprising at least acicular ITO particles and granular ITO particles.

(15) Fifteenthly, the invention provides the transparent conductive film of (14), wherein the weight ratio of said acicular ITO particles to said granular ITO particles is in the range of from 2:98 to 98:2.

(16) Sixteenthly, the invention provides the transparent conductive film of (14) or (15), wherein said acicular ITO particles have a major axis of 0.5 μm or less, a minor axis of 0.1 μm or less, a major-to-minor axis ratio of 1.5–10 and a $SnO_2$ content of 2–20 wt % whereas said granular ITO particles have a grain size of 0.05 μm or less and a $SnO_2$ content of 2–20 wt %.

(17) Seventeenthly, the invention provides the transparent conductive film of (14), (15) or (16) which has a sheet resistance of 10 kΩ/□ or less.

(18) Eighteenthly, the invention provides the transparent conductive film of (14), (15), (16) or (17) which has a light transmittance of 80% or more and a haze value of 2% or less in haze measurement.

(19) Nineteenthly, the invention provides a process for forming the transparent conductive film of (14), (15), (16), (17) or (18) which comprises the steps of mixing said acicular ITO particles with said granular ITO particles in a solvent, dispersing the mixed particles to form a slurry and applying the slurry to a transparent substrate.

The particles of the Sn-containing In oxide can be produced by a process comprising the following steps.

(1) Preparing the Acidic Aqueous Solution as the Starting Material

To prepare the starting acidic aqueous solution, it is preferred to dissolve In in hydrochloric acid and then further dissolve stannic chloride in the resulting aqueous solution of indium chloride. The In concentration in the starting acidic aqueous solution is preferably 2–50 g/L, more preferably 2–30 g/L. Beyond 50 g/L, hydroxide particles which are the precursor of the oxide will agglomerate, rather than forming acicular or tabular grains. Below 2 g/L, only lumps of unduly small size will form. The Sn content of the starting acidic aqueous solution is preferably such that the Sn content in the finally obtained oxide is 2–20 wt %, more preferably 5–10 wt %, as calculated for $SnO_2$. On the following pages, wt % is simply written as %. Outside the range of 2–20%, the conductivity of the oxide lowers. The acid to be used is not limited to hydrochloric acid (hereunder sometimes written as HCl) and it may be replaced by nitric acid (hereunder sometimes written as $HNO_3$), sulfuric acid (hereunder sometimes written as $H_2SO_4$), etc.

Exemplary alkalies that can be used in the preliminary and full neutralization steps include $NH_4OH$ (hereunder sometimes called ammonia or written as $NH_3$), NaOH and KOH. Note that carbonate alkalies have the disadvantage that the hydroxide particles tend to form unduly small lumps, making it difficult to obtain the desired shape. The alkalies are preferably added in the form of a diluted alkaline aqueous solution. The alkalies need be added in an amount equivalent to the one necessary to hydrolyze the In and Sn salts in the acidic aqueous solution and it is preferred to add more than the equivalent amount in order to neutralize the excess acid content.

(2) Preliminary Neutralization and Full Neutralization

To generate the precursor Sn-containing In hydroxide, the acidic aqueous solution prepared in (1) is preferably held at 45° C. or less, more preferably at 25° C. or less, and the above-described alkali is added so that the acidic aqueous solution is preliminarily neutralized to a pH of 2–4. In the subsequent step of full neutralization, the temperature of the preliminarily neutralized solution is raised preferably to at least 50° C., more preferably to between 80 and 95° C., over a period of from 30 minutes to 2 hours, and the above-mentioned alkali is added so that the solution is neutralized preferably to a pH of 7–8, whereupon the Sn-containing In hydroxide is precipitated; the precipitate is then recovered by filtration, washed and dried.

The acidic aqueous solution containing Sn and In is first subjected to preliminary neutralization to generate fine nuclei. In the subsequent step of full neutralization at elevated temperature, the nuclei are grown to acicular or tabular hydroxide grains. The shape of the grains to be generated is controlled by adjusting conditions such as the ratio of neutralization by preliminary neutralization (i.e., the ratio of the In content precipitated in preliminary neutralization as relative to the total In content which is taken as unity), temperature and pH. In addition, by employing different temperature ranges in preliminary neutralization and full neutralization, grains of the desired size and shape can be generated in a fairly uniform manner. Uniformity can also be achieved by additional operations such as ripening of the fine nuclei.

(3) Sn-Containing In Hydroxide

The thus obtained hydroxide is processed to larger grains than the final oxide since it is sintered in the subsequent firing step. To be more specific, the hydroxide is processed to acicular or tabular grains having a major axis of 0.05–0.3 $\mu$m, a minor axis of 0.01–0.2 $\mu$m, and a major-to-minor axis ratio of 1.5–10.

(4) Firing

The processed Sn-containing In hydroxide is then fired so that it undergoes dehydrative decomposition and sintering to yield acicular or tabular oxide grains that maintain the shape anisotropy of the aforementioned hydroxide particles. As the result of this firing step, oxygen deficiencies are introduced to produce an oxide having enhanced electrical conductivity. Firing in an oxidizing atmosphere is capable of producing oxide grains having a certain degree of conductivity but their resistance is an order of magnitude higher than the desired value.

The firing atmosphere is preferably an inert gas such as nitrogen containing water vapor and more preferably it also contains a reducing gas such as $NH_3$.

The firing temperature is set in accordance with the size and shape of the hydroxide particles and the firing gas atmosphere. The higher the firing temperature and the content of water vapor and the stronger the reducing nature of the firing atmosphere, the faster the rate of sintering and the less anisotropic the product oxide is. The preferred firing temperature is between 300 and 1,000° C., with the range of 300–700° C. being more preferred. By firing in the above-mentioned temperature range and atmosphere, one can produce the intended oxide particles which maintain the shape anisotropy of the hydroxide particles. Note that if firing is done at temperatures below 300° C., the hydroxide is decomposed only insufficiently; if the firing temperature exceeds 1,000° C., it becomes difficult to maintain the shape anisotropy of the hydroxide particles and, in addition, more aggregates form on account of inter-grain sintering and the particles become less dispersible.

It should also be noted that the hydroxide particles just after dehydrative decomposition have low degree of crystallinity and unless they grow into larger crystals, the resistance between crystallites within grains lowers conductivity. In order to promote sintering, water vapor is preferably added to the firing atmosphere and to further enhance conductivity, reducing $NH_3$ and $H_2$ are preferably contained in the firing atmosphere.

(5) Sn-Containing In Oxide Particles

The oxide particles of the invention are acicular or tabular Sn-containing In oxide grains having a major axis of no more than 0.2 $\mu$m, preferably no more than 0.1 $\mu$m, and a minor axis of no more than 0.1 $\mu$m, preferably no more than 0.05 $\mu$m. Preferably, they have a major-to-minor axis ratio of 1.5–10, more preferably 2–5.

If the major axis of the Sn-containing In oxide grains is longer than 0.2 $\mu$m, scattering of visible light occurs to deteriorate the optical characteristics including transmittance. The scattering of visible light is suppressed more effectively if the major axis is 0.1 $\mu$m or less. If the minor axis of the Sn-containing In oxide grains is longer than 0.1 $\mu$m, less of the grain surfaces contact each other to lower the conductivity of the coating deposited from the grains. The conductivity of the coating is enhanced more effectively if the minor axis is 0.05 $\mu$m or less. If the major-to-minor axis ratio of the Sn-containing In oxide grains is outside the range of 1.5–10, their conductivity, dispersability and intra-grain crystallinity deteriorate and, in particular, at values less than 1.5, the desired effects such as shape anisotropy and lower resistance are not attained.

The crystallite diameter $D_x$ of the Sn-containing In oxide grains as calculated from the half-peak width of (222) faces by x-ray diffraction is preferably at least 150 Å and the ratio of $D_x$ to $D_{bet}$ which is the diameter of a grain as determined for an equivalent sphere from the specific surface area is at least 0.45; the fewer the crystallites that are observed within grains by examination with a transmission electron microscope (hereunder sometimes designated as TEM), the lower the resistance the grains would have.

(6) Coating Solution and Conductive Coating

The ITO grains described above are dispersed in a solvent to prepare a coating solution. After applying the coating solution to a substrate, the solvent is evaporated and the remaining film is fixed to form a coating that has high transmittance of light and low electrical resistance.

Coating solutions can be prepared by conventional methods. To organic solvents such as alcohols, ketones and ethers, dispersants such as surfactants and coupling agents are added and dispersed with a disperser such as a beads mill. If binders, organic or inorganic, are to be used, they may be first added to the ITO coating solution which is then applied to the substrate to form a coating; alternatively, a coating is first deposited from the ITO coating solution and the binder is then applied to the coating and fixed.

The ITO powder to be used in the invention to form a transparent conductive film is basically a mixture of acicular ITO particles and granular ITO particles and characterized in that the acicular ITO particles confer satisfactory sheet resistance without compromising the high dispersability provided by the granular ITO particles. To be more specific, the granular ITO particles improve the dispersability of the fine particles of the ITO powder, thereby suppressing the occurrence of scattered light to provide high optical characteristics, i.e., anti-haze property and high transmittance of light, while maintaining the high sheet conductivity conferred by the fine acicular ITO particles. In addition, the improved dispersability of the particles of the ITO powder contributes to fully exploiting the advantages of the coating process as a technique of producing transparent conductive ITO films. Further, these effects can be rendered more positive by using an ITO powder comprising particles of a specified shape and a specified size. The acicular ITO particles as used in the invention embrace substantially tabular or flaky ITO grains and the granular ITO particles embrace substantially spherical ITO grains.

The acicular ITO particles in the mixed ITO powder described above are fine, acicular or tabular Sn-containing In oxide grains having a $SnO_2$ content of 2–20 wt %, a major axis of no more than 0.5 $\mu$m, preferably no more than 0.2 $\mu$m, and a minor axis of no more than 0.1 $\mu$m. These grains have a major-to-minor axis ratio of 1.5–10.

If the major axis of the acicular ITO particles is longer than 0.5 $\mu$m, scattering of visible light occurs to deteriorate the optical characteristics including light transmission and haze. The scattering of visible light is suppressed more effectively if the major axis is 0.2 $\mu$m or less. If the minor axis of the acicular ITO particles is longer than 0.1 $\mu$m, less of the grain surfaces contact each other to lower the conductivity of the coating deposited from the particles. The conductivity of the coating is enhanced more effectively if the minor axis is 0.05 $\mu$m or less. If the major-to-minor axis ratio of the acicular ITO particles is outside the range of 1.5–10, their conductivity, dispersability and intra-grain crystallinity deteriorate and, in particular, at values less than 1.5, the desired effects such as shape anisotropy and lower resistance are not attained.

The fine acicular ITO particles in the fine ITO powder that has been discovered by the present inventors can be produced by a process comprising the aforementioned steps.

The granular ITO particles to be used in the fine mixed ITO powder of the invention can be produced by techniques in the public domain as exemplified below.

First, stannic chloride is added to an In-containing aqueous solution of hydrochloric acid to prepare an acidic aqueous solution. Also prepared is an aqueous alkali solution from $NH_4OH$ and the like. The aqueous alkali solution is added to the acidic aqueous solution so that the latter is neutralized to a pH of about 7–8; the resulting precipitate is recovered by filtration, dehydrated and dried to produce a Sn-containing In hydroxide. The hydroxide is fired in a nitrogen gas atmosphere containing water vapor and $NH_3$ at a temperature between about 600 and 700° C. to produce granular or spherical ITO particles having a major-to-minor axis ratio of about 1–2.

The thus obtained granular ITO particles are mixed in a desired relative proportion with the separately prepared acicular ITO particles. To be more specific, the two types of ITO particles are mixed by dispersing them uniformly in a solvent to form a coating slurry. The slurry is then applied to a transparent substrate such as a glass plate and the solvent is evaporated to fix a film, thereby producing a transparent conductive coating that forms a uniform dispersion, has less haze, transmits a large amount of light and that presents low electrical resistance.

Speaking of mixing with the solvent, the acicular ITO particles and the granular ITO particles may be added in desired proportions into the solvent and then mixed to form a dispersion. Alternatively, the acicular ITO particles and the granular ITO particles may be dry mixed in desired proportions and the mixture is then added to the solvent to form a dispersion.

If desired, there may be prepared a powder containing the acicular ITO particles in admixture with the granular ITO particles and the powder is added to the solvent to form a dispersion. In order to prepare a powder containing the acicular ITO particles in admixture with the granular ITO particles, a slurry of the acicular Sn-containing In hydroxide is mixed with a slurry of the granular Sn-containing In hydroxide and the resulting mixture is filtered, followed by dehydration, drying and firing of the residue. Alternatively, the acicular Sn-containing In hydroxide particles and the granular Sn-containing In hydroxide particles may preliminarily be mixed to form a slurry which is subjected to the steps of filtration, dehydration, drying and firing.

Coating solutions can be prepared by conventional methods. To organic solvents such as alcohols, ketones and ethers, dispersants such as surfactants and coupling agents are added and dispersed with a disperser such as a beads mill. If binders, organic or inorganic, are to be used, they may be first added to the ITO coating solution which is then applied to the substrate to form a coating; alternatively, a coating is first deposited from the ITO coating solution and the binder is then applied to the coating and fixed.

In order to ensure that the requirements for lower sheet resistance and haze prevention are met simultaneously, the acicular ITO particles and the granular ITO particles can effectively be mixed in weight ratios over a broad range of from 2:98 to 98:2; the preferred range is from 5:95 to 50:50, more preferably from 5:95 to 30:70.

As already mentioned, the acicular ITO particles preferably have a major axis of no more than 0.5 $\mu$m, a minor axis of no more than 0.1 $\mu$m, a major-to-minor axis ratio of 1.5–10, and a $SnO_2$ content of 2–20 wt %. The granular ITO particles preferably have a grain size of no more than 0.05 $\mu$m and a $SnO_2$ content of 2–20 wt %.

Using the ITO powder described above, one can produce a transparent conductive film having a sheet resistance of no more than 10 k$\Omega$/□ and outstanding optical characteristics, i.e., a light transmittance of at least 80% and a haze value of no more than 2% as determined by haze measurement.

The advantages of the invention can be attained irrespective of whether the acicular ITO particles and the granular ITO particles are mixed by a dry or wet method. Dry mixing the two kinds of ITO particles requires only one dispersing step and hence offers the advantage of giving higher productivity. However, the choice of the dry or wet process depends on various considerations including the mixing equipment and the ease or difficulty in the mixing operation.

The following examples are provided for the purpose of further illustrating the present invention but are in no way to be taken as limiting the technical scope of the invention.

EXAMPLE 1

Figure 1:
FIG. 1 is a transmission electron micrograph of the Sn-containing In hydroxide particles prepared in Example 1 (the micrograph taken at 200.0 kV×100 K; the clear straight line at the bottom indicates a length of 50 nm)

To 200 grams of aqueous hydrochloric acid containing 18% In, pure water was added to make 2.9 liters. To the solution, 5.4 grams of stannic chloride was added to prepare a starting acidic aqueous solution which was charged into a glass beaker. In a separate step, 150 grams of 25% aqueous $NH_3$ was diluted with 1350 grams of pure water and the resulting alkali solution was added to the already prepared acidic aqueous solution. In the first place, to the acidic aqueous solution being held at 20° C., the alkali solution was added over a period of 17 minutes to achieve preliminary neutralization to a pH of 3. Then, the temperature of the preliminarily neutralized solution was raised to 90° C. and the remaining alkali solution was added over a period of 60 minutes to effect full neutralization. The final pH was 7.5. The resulting precipitate was recovered by filtration, dehydrated and dried to give a Sn-containing In hydroxide in solid form. Particles of this Sn-containing In hydroxide were examined by TEM and the result is shown in FIG. 1. The particles of the hydroxide had a major axis of 0.077 µm, a minor axis of 0.028 µm and a major-to-minor axis ratio of 2.8.

Figure 2:
FIG. 2 is a transmission electron micrograph of the Sn-containing In oxide particles prepared in Example 1 (the micrograph taken at 200.0 kV×100 K; the clear straight line at the bottom indicates a length of 50 nm)

The prepared Sn-containing In hydroxide was put into a tubular furnace and fired in a nitrogen gas atmosphere containing 1.5 vol % water vapor and 0.05 vol % $NH_3$ gas at 600° C. for 2 hours. Particles of the resulting Sn-containing In oxide were examined by TEM and the result is shown in FIG. 2. The particles of the oxide were tabular grains having a major axis of 0.041 µm, a minor axis of 0.025 µm and a major-to-minor axis ratio of 1.64. To determine the major and minor axes of the Sn-containing In oxide grains, fifty grains were chosen from the TEM image and their major and minor axes were measured with a vernier caliper, multiplied by the magnification and the average was taken. The ratio of the major axis to the minor axis was also calculated. The specific surface area of the powder prepared in Example 1 was measured by the one-point BET method and was found to be 27.5 $m^2$/g. The crystallite diameter Dx was 210 Å and Dx/Dbet was 0.68.

Five grams of the thus prepared powder, 20 grams of a mixed solvent (a 7:3 mixture of ethanol and propanol) and 0.25 grams of an anionic surfactant as a dispersant were put into a planetary ball mill (Model P-5 of Fritsche AG; vessel capacity, 80 mL; milling medium=0.3 mm$^\Phi$ PSZ balls). The ball mill was rotated at 300 rpm for 30 minutes to prepare a dispersion. By adding colloidal silica and ethanol to the dispersion, a coating solution was prepared which contained 2% of the ITO powder, 2% of silica and the balance being ethanol and propanol. A glass plate was spin coated with the coating solution and dried at 200° C. for 30 minutes to form a transparent conductive film 0.3 µm thick. The film was found to have a sheet resistance of 5 kΩ/□. Spectrophotometry showed that the transparent conductive film was of good quality having a light transmittance of 90% (at λ=540 nm).

EXAMPLE 2

Figure 3:
FIG. 3 is a transmission electron micrograph of the Sn-containing In hydroxide particles prepared in Example 2

An acidic aqueous solution and an alkali solution were prepared as in Example 1. In the first place, to the acidic aqueous solution being held at 20° C., the alkali solution was added over a period of 15 minutes to achieve preliminary neutralization to a pH of 3.5. Then, the temperature of the preliminarily neutralized solution was raised to 90° C. and the remaining alkali solution was added over a period of 60 minutes to effect full neutralization. The final pH was 7.5. The resulting precipitate was recovered by filtration, dehydrated and dried to give a Sn-containing In hydroxide in solid form. Particles of this Sn-containing In hydroxide were examined by TEM and the result is shown in FIG. 3. The particles of the hydroxide had a major axis of 0.246 µm, a minor axis of 0.062 µm and a major-to-minor axis ratio of 4.

The prepared Sn-containing In hydroxide was put into a tubular furnace and fired in a nitrogen gas atmosphere containing 1.5 vol % water vapor at 700° C. for 2 hours. Particles of the resulting Sn-containing In oxide were examined by TEM and the result is shown in FIG. 4. The particles of the oxide were acicular grains having a major axis of 0.075 µm, a minor axis of 0.029 µm and a major-to-minor axis ratio of 2.6. The specific surface area of the powder prepared in Example 2 was measured by the one-point BET method and was found to be 33 $m^2$/g. The crystallite diameter Dx was 165 Å and Dx/Dbet was 0.64.

The thus prepared powder was spin coated and processed as in Example 1 to form a transparent conductive film 0.3 µm thick. The film was found to have a sheet resistance of 45 kΩ/□. Spectrophotometry showed that the transparent conductive film was of good quality having a light transmittance of 90% (at λ=540 nm).

COMPARATIVE EXAMPLE 1

An acidic aqueous solution and an alkali solution were prepared as in Example 1. To the acidic aqueous solution being held at 35° C., the alkali solution was added over a period of 60 minutes to give a final pH of 7.5. The resulting precipitate was recovered by filtration, dehydrated and dried to give a Sn-containing In hydroxide in solid form. Particles of this Sn-containing In hydroxide were examined by TEM and the result is shown in FIG. 5. The particles of the hydroxide formed agglomerates having a major axis of 0.039 µm and a minor axis of 0.032 µm.

The prepared Sn-containing In hydroxide was put into a tubular furnace and fired in a nitrogen gas atmosphere containing 1.5 vol % water vapor and 0.05 vol % $NH_3$ gas at 645° C. for 2 hours. Particles of the resulting Sn-containing In oxide were examined by TEM and the result is shown in FIG. 6. The particles of the oxide formed lumps. The specific surface area of the powder prepared in Comparative Example 1 was measured by the one-point BET method and was found to be 28 $m^2$/g. The crystallite diameter Dx was 260 Å and Dx/Dbet was 0.86.

The thus prepared powder was spin coated and processed as in Example 1 to form a transparent conductive film 0.3 µm thick. The film was found to have a sheet resistance of 20 kΩ/□. Spectrophotometry showed that the transparent conductive film was of good quality having a light transmittance of 90% (at λ=540 nm). Unlike in Examples 1 and 2, the particles of the Sn-containing In oxide had point contact with each other to increase the resistance of the coating.

COMPARATIVE EXAMPLE 2

A Sn-containing In hydroxide was prepared as in Comparative Example 1, except that the acidic aqueous solution was held at 50° C. during neutralization. Particles of this Sn-containing In hydroxide were examined by TEM and the result is shown in FIG. 7. The particles of the hydroxide had a major axis of 0.215 µm, a minor axis of 0.105 µm, and a major-to-minor axis ratio of 2.1.

The prepared Sn-containing In hydroxide was fired in a nitrogen gas atmosphere at 700° C. for 2 hours. Particles of the Sn-containing In oxide formed by firing were examined by TEM and the result is shown in FIG. 8. The particles of the oxide were coarse grains having a major axis of 0.270 µm, a minor axis of 0.150 µm and a major-to-minor axis ratio of 1.8. The specific surface area of the powder prepared in Comparative Example 2 was measured by the one-point BET method and was found to be 13.6 $m^2$/g. The crystallite diameter Dx was 270 Å and Dx/Dbet was 0.43.

The thus prepared powder was spin coated and processed as in Example 1 to form a transparent conductive film 0.3 μm thick. The film was found to have a light transmittance as low as 70% and a sheet resistance as high as 15 kΩ/□.

EXAMPLE 3

To 200 grams of aqueous HCl containing 18% In, pure water was added to make 2.9 liters. To the solution, 5.4 grams of stannic chloride was added to prepare a starting acidic aqueous solution. In a separate step, 150 grams of 25% aqueous $NH_3$ was diluted with 1350 grams of pure water to prepare an alkali solution. Subsequently, to the acidic aqueous solution being held at 20° C., part of the alkali solution was added over a period of 17 minutes to achieve preliminary neutralization to a pH of 3. Then, the temperature of the preliminarily neutralized solution was raised to 90° C. and the remaining part of the alkali solution was added over a period of 60 minutes to effect full neutralization. The final pH was 7.5. The resulting precipitate was recovered by filtration, dehydrated and dried to give a Sn-containing In hydroxide in solid form that comprised acicular particles.

The prepared Sn-containing In hydroxide was put into a tubular furnace and fired in a nitrogen gas atmosphere containing 1.5 vol % water vapor and 0.05 vol % $NH_3$ gas at 600° C. for 2 hours. Particles of the resulting Sn-containing In oxide, or the ITO particles with a Sn content of 5 wt %, were acicular particles having an average major axis of 0.069 μm, an average minor axis of 0.029 μm, an average major-to-minor axis ratio of 2.38, a BET specific surface area of 30.4 $m^2/g$, and a crystallite diameter Dx of 20.6 nm.

In the next step, granular ITO particles were prepared. To begin with, an acidic aqueous solution and an alkali solution were prepared by repeating the procedure for preparing the acicular ITO particles. To the acidic aqueous solution being held at 35° C., all of the alkali solution was added over a period of 60 minutes to give a final pH of 7.5. The neutralized solution was filtered and the residue was dehydrated and dried to give granular particles of a Sn-containing In hydroxide. The obtained hydroxide particles formed agglomerates having a major axis of 0.039 μm and a minor axis of 0.032 μm.

The prepared Sn-containing In hydroxide was put into a tubular furnace and fired in a nitrogen gas atmosphere containing 1.5 vol % water vapor and 0.05 vol % $NH_3$ gas at 645° C. for 2 hours. Particles of the resulting Sn-containing In oxide, or the ITO particles with a Sn content of 5 wt %, were granular in shape. These particles had a BET specific surface area of 28 $m^2/g$ and a crystallite diameter Dx of 260 nm.

One gram of the acicular ITO particles and four grams of the granular ITO particles were mixed with a mixer. Five grams of the mixed powder, 20 grams of a mixed solvent (a 7:3 mixture of ethanol and propanol) and 0.25 grams of an anionic surfactant as a dispersant were put into a planetary ball mill (Model P-5 of Fritsche AG; vessel capacity, 80 mL; milling medium=0.3 $mm^\phi$ PSZ balls). The ball mill was rotated at 300 rpm for 30 minutes to prepare a dispersion.

By adding colloidal silica and ethanol to the dispersion, a slurry was prepared which contained 2% of the mixed ITO powder, 2% of silica and the balance being ethanol and propanol. A glass plate was spin coated with the slurry and dried at 200° C. for 30 minutes to form a transparent conductive coating 0.3 μm thick.

The coating was found to have a sheet resistance of 5.3 kΩ/□. Its light transmittance and haze were measured with a haze meter (turbidimeter NDH 2000 of Nippon Denshoku Kogyo Co., Ltd.) in accordance with the method of JIS K 7136; the transparent conductive coating was found to be of good quality having a light transmittance of 90% and a haze value of 1%.

EXAMPLE 4

Two grams and a half of the acicular ITO particles prepared in Example 3 and two grams and a half of the granular ITO particles also prepared in Example 3 were mixed with a mixer. The resulting 50:50 mixed ITO powder was subsequently treated as in Example 3 to prepare a slurry, which was spin coated on a glass plate and dried to prepare a transparent conductive coating.

The coating had a sheet resistance of 5.2 kΩ/□, a light transmittance of 90% and a haze value of 1.5%.

EXAMPLE 5

A transparent conductive coating was produced by repeating the procedure of Example 3, except that four grams of the acicular ITO particles prepared in Example 3 and one gram of the granular ITO particles also prepared in Example 3 were mixed.

The coating had a sheet resistance of 5.1 kΩ/□, a light transmittance of 90% and a haze value of 2%.

EXAMPLE 6

The procedure of Example 3 was repeated, except that the time period of preliminary neutralization with alkali was changed from 17 minutes to 13 minutes. Acicular particles of the resulting Sn-containing In oxide, or the ITO particles with a Sn content of 5 wt %, had an average major axis of 0.309 μm, an average minor axis of 0.071 μm, an average major-to-minor axis ratio of 4.37, a BET specific surface area of 20.7 $m^2/g$, and a crystallite diameter Dx of 16.7 nm. Using these particles, a transparent conductive coating was formed by repeating the procedure of Example 3. The coating had a sheet resistance of 5.1 kΩ/□, a light transmittance of 90% and a haze value of 1.1%.

COMPARATIVE EXAMPLE 3

Using only the granular ITO particles prepared in Example 3, a transparent conductive coating was formed by repeating the procedure of Example 3. The coating had a sheet resistance as high as 20 kΩ/□; it also had a light transmittance of 90% and a haze value of 1%.

COMPARATIVE EXAMPLE 4

Using only the acicular ITO particles prepared in Example 3, a transparent conductive coating was formed by repeating the procedure of Example 3. The coating had a sheet resistance of 5 kΩ/□ and a light transmittance of 90% but its haze value increased to 5%.

The descriptions of the coatings formed in Examples 3–6 and Comparative Examples 3 and 4 are given in Table 1 below. When the content of the acicular particles was zero (only granular particles were used), the resulting powder had good dispersability and the coating had high transmittance of light and low haze; however, the coating had an abnormally high sheet resistance. As the content of the acicular particles increased, the dispersability of the powder decreased and the haze value of the coating increased somewhat but the sheet resistance lowered. When the relative content of the acicular particles was 100% (no granular particles were used), the sheet resistance of the coating decreased further but the haze value was abnormally high. When the mixing ratio of the acicular and granular particles was in the range of from 20:80 to 80:20, the powder had good dispersability and the coating satisfied both requirements for low resistance and haze.

TABLE 1

| Mixed ITO powder | Mixing ratio | | Film resistance k$\Omega$/□ | Transmittance % | Haze % |
|---|---|---|---|---|---|
| | Acicular | Granular | | | |
| Example 3 | 20 | 80 | 5.3 | 90 | 1 |
| Example 4 | 50 | 50 | 5.2 | 90 | 1.5 |
| Example 5 | 80 | 20 | 5.1 | 90 | 2 |
| Example 6 | 20 | 80 | 5.1 | 90 | 1.1 |
| Comparative Example 3 | 0 | 100 | 20 | 90 | 1 |
| Comparative Example 4 | 100 | 0 | 5 | 90 | 5 |

According to one aspect of the present invention, one can produce acicular or tabular Sn-containing In oxide particles having major and minor axes no longer than specified values and a major-to-minor axis ratio within a specified range. Conductive coatings prepared from these particles have increased faces of contact between particles, contributing to higher electrical conductivity, and they also have high transmittance of light. The coatings are suitable for use on large-scale CRTs and are capable of forming high-definition electrodes on display devices; in addition, the coatings can be formed at low cost since they are applied by the coating process.

According to another aspect of the invention, a conductive coating is formed from a slurry of an ITO powder consisting of acicular ITO particles and granular ITO particles, preferably an ITO powder in which fine acicular or tabular ITO particles having major and minor axes no longer than specified values and a major-to-minor axis ratio within a specified range and granular or spherical ITO particles having a size no greater than a specified value are mixed in specified proportions. Conductive coatings prepared from this mixed ITO powder have the conductive particles dispersed effectively and they also have increased faces of contact between particles, contributing to higher electrical conductivity; due to the good dispersability of the particles, the scattering of light is suppressed to lower the haze while maintaining high transparency of light. The coatings are suitable for use on large-scale CRTs and are capable of forming high-definition electrodes on display devices; in addition, the coatings can be formed at low cost since they are applied by the coating process.

What is claimed is:

1. A Sn-containing In oxide in the form of needles or plates comprising particles having a major axis of 0.1 $\mu$m or less and a minor axis of 0.05 $\mu$m or less.

2. The Sn-containing In oxide according to claim 1, wherein the particles have a major-to-minor axis ratio of 1.5–10.

3. The Sn-containing In oxide according to claim 2, wherein the major-to-minor axis ratio is 2 to 5.

4. A coating solution comprising the particles of the Sn-containing In oxide according to claim 1 dispersed in a solvent or a resin-containing solvent.

5. A coating solution comprising the particles of the Sn-containing In oxide according to claim 2 dispersed in a solvent or a resin-containing solvent.

6. In an electrically conductive coating including a conductive material, the improvement comprising the conductive coating containing the particles of the Sn-containing In oxide according to claim 1 as the conductive material.

7. In an electrically conductive coating including a conductive material, the improvement comprising the conductive coating containing the particles of the Sn-containing In oxide according to claim 2 as the conductive material.

8. A process for producing the Sn-containing In oxide according to claim 1 which comprises the steps of:

(a) preparing an acidic aqueous solution containing Sn and In, (b) adding a first portion of an alkali to the acidic aqueous solution at a temperature of the solution of 40° C. or below to prepare a preliminarily neutralized aqueous solution, (c) raising the temperature of the preliminarily neutralized aqueous solution from step (b), (d) adding a second portion of said alkali to the aqueous solution from step (c) at a temperature of the solution of 50° C. or above to prepare a fully neutralized solution, and forming Sn-containing In hydroxide particles, and (e) firing the Sn-containing In hydroxide particles from step (d).

9. The process according to claim 8, wherein the acid in said acidic aqueous solution is HCl, HNO$_3$ or H$_2$SO$_4$ and said alkali is NH$_4$OH, NaOH or KOH.

10. The process according to claim 8, wherein the preliminarily neutralized solution has a pH of 2–4 and the fully neutralized solution has a pH of 7–8.

11. The process according to claim 8, wherein said firing is performed in an inert gas containing water vapor or both water vapor and a reducing gas at 300–1,000° C. while maintaining the shape anisotropy of the particles of said Sn-containing In hydroxide.

12. The process according to claim 8, wherein the temperature of the solution in step (b) is 25° C. or below.

13. The process according to claim 8, wherein the temperature of the solution in step (d) is 80 to 95° C.

14. The process according to claim 12, wherein the temperature of the solution in step (d) is 80 to 95° C.

15. A transparent conductive film forming ITO powder comprising (i) acicular ITO particles having a major axis of 0.1 $\mu$m or less, a minor axis of 0.05 $\mu$m or less, a major-to-minor axis ratio of 1.5–10 and a SnO$_2$ content of 2–20 wt %, and (ii) granular ITO particles having a grain size of 0.05 $\mu$m or less and a SnO$_2$ content of 2–20 wt %.

16. The transparent conductive film forming ITO powder according to claim 15, wherein the weight ratio of said acicular ITO particles to said granular ITO particles is in the range of from 2:98 to 98:2.

17. The transparent conductive film forming ITO powder according to claim 16, wherein the weight ratio is 5:95 to 50:50.

18. The transparent conductive film forming ITO powder according to claim 16, wherein the weight ratio is 5:95 to 30:70.

* * * * *